Dec. 13, 1960   F. E. SMITH   2,963,977
PRESSURE REGULATOR
Filed Oct. 11, 1956   4 Sheets-Sheet 1

INVENTOR.
FREDERICK E. SMITH
BY
ATTORNEYS

Dec. 13, 1960          F. E. SMITH          2,963,977
PRESSURE REGULATOR

Filed Oct. 11, 1956          4 Sheets—Sheet 3

INVENTOR.
FREDERICK E. SMITH
BY
ATTORNEYS

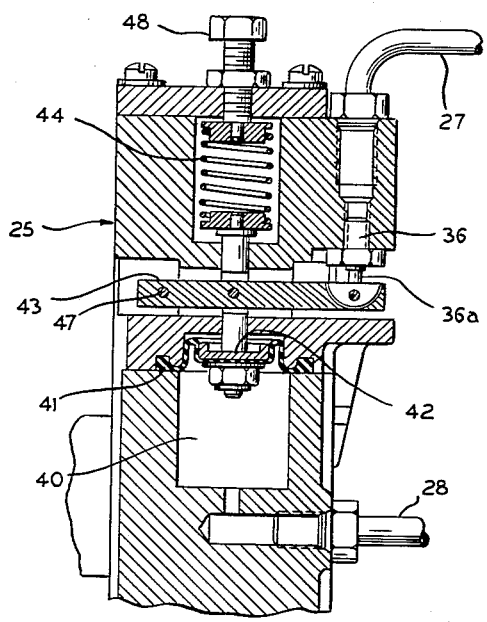
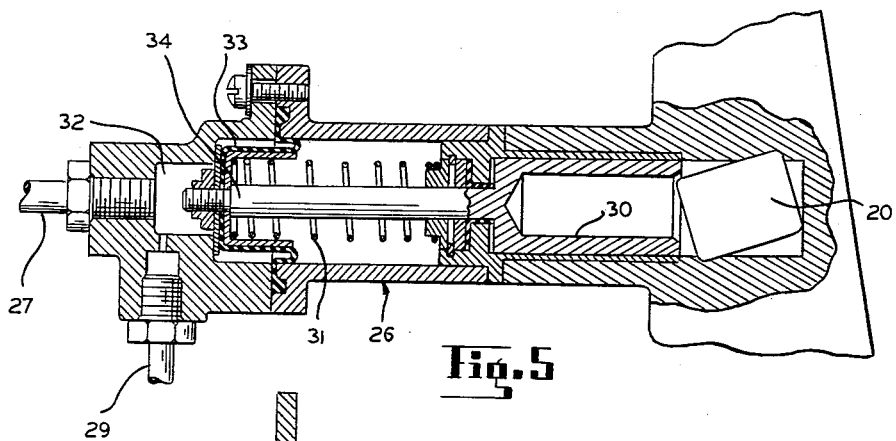
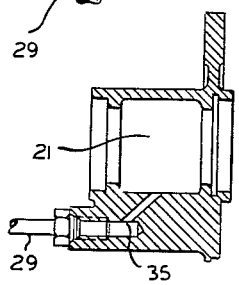

United States Patent Office 2,963,977
Patented Dec. 13, 1960

2,963,977
PRESSURE REGULATOR

Frederick E. Smith, Cleveland Heights, Ohio, assignor to Thompson Ramo Wooldridge Inc., a corporation of Ohio Filed Oct. 11, 1956, Ser. No. 615,299

2 Claims. (Cl. 103—97)

The present invention relates to automatic pressure regulation and is, more particularly, concerned with the provision of high efficiency pressure regulation in connection with aircraft fuel pumps having a minimum physical dimension and a minimum over-all weight.

As those skilled in the art of fluid distribution in aircraft systems are aware, the space limitations imposed upon equipment are severe. Satisfactory apparatus must be of an absolute minimum size and weight and yet must perform with high efficiency. Further, in view of the vibrations constantly applied to any system utilized in aircraft, fluid distribution systems must incorporate accessory conduits of an absolute minimum length to prevent fatigue failures in the distribution conduits.

The present invention comprises a pressure regulator system for installations requiring an absolute minimum of space, weight, and accessory piping and is of particular utility in connection with aircraft installations. In the preferred embodiment illustrated below, the pressure regulator of the present invention is incorporated in a centrifugal fuel booster pump and is arranged so that the fuel output from the booster pump is maintained at a substantially constant outlet pressure. In the present system, a very high efficiency is retained in the booster pump by positioning the control valve which limits the output of the centrifugal pump in the diffusion portion of the volute nozzle. This positioning places the control valve at an area of relatively small cross-section thereby minimizing the size of the necessary valves. Still further, in accordance with the present system, the control pressures utilized in the pressure regulation are taken from a somewhat larger collector chamber at the outlet of the pump downstream somewhat from the control valve and subject mainly to static pressure variations rather than the somewhat less reliable pressures at or adjacent to the control valve itself. As a result of the extremely compact arrangement herein utilized, however, the necessary connecting conduits leading from the collecting chamber to the control valve are extremely short and inherently rigid.

It is, accordingly, an object of the present invention to provide a pressure regulation system of small dimensions, weight, and high efficiency.

Still a further object of the present invention is to provide an improved pressure regulation system for centrifugal fluid pumps having a volute nozzle discharge passageway.

Another object of the present invention is to provide a fluid pressure regulation for a centrifugal pump wherein pressure regulation is effected by means of a reciprocal gate valve positioned in the volute discharge nozzle of the pump and is subjected to control pressures taken from a point downstream from the valve.

A still further object of the present invention is to provide an effective control valve for lightweight fuel booster pumps of the aircraft type, or the like.

A feature of the present invention is the provision of a pressure regulating reciprocal control valve positioned in a diverging discharge nozzle of the volute of a centrifugal fluid pump.

Another feature of the invention is the provision of a pressure regulating valve in the diffusion section of a discharge nozzle of a centrifugal pump and the provision of fluid pressure control means therefor deriving control pressures from the static pressure of a collector chamber downstream of the control valve and reflecting the final output pressure of the pump.

Yet another feature of the invention is the unitization of a pressure regulation system into a centrifugal pump employing a volute discharge nozzle.

Still other and further objects and features of the present invention will at once become apparent to those skilled in the art for a consideration of the attached drawings wherein an embodiment of the present invention is shown by way of illustration only, and wherein:

Figure 4 is a cross-sectional view taken along the line IV—IV of Figure 1 and illustrating the components of the regulator portion of the system;

Figure 5 is a cross-sectional view taken along the line V—V of Figure 1 and showing the components of the control valve of the present system; and Figure 6 is a cross-sectional view taken along the line VI—VI of Figure 1 illustrating the fluid connection leading from the pump outlet collector to the control valve of the present invention.

As shown on the drawings:

Figure 1:
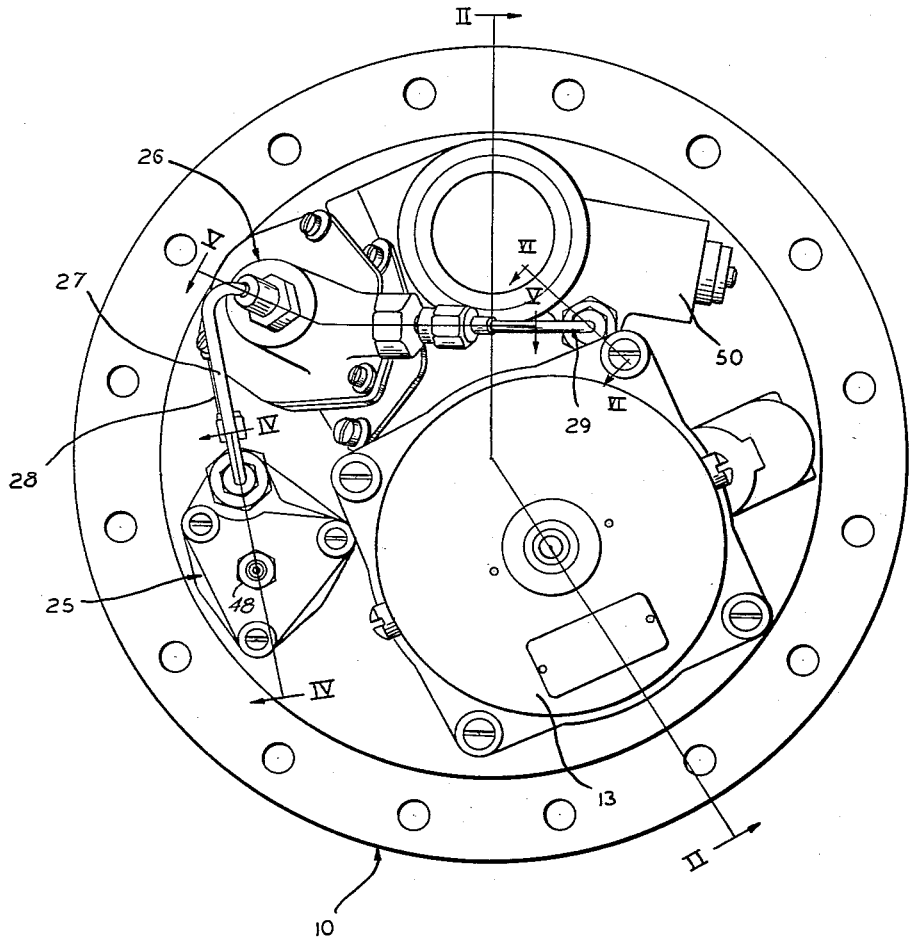
Figure 1 is an end elevational view of the centrifugal pump and pressure regulator constructed in accordance with the principles of the present invention.
Figure 2:
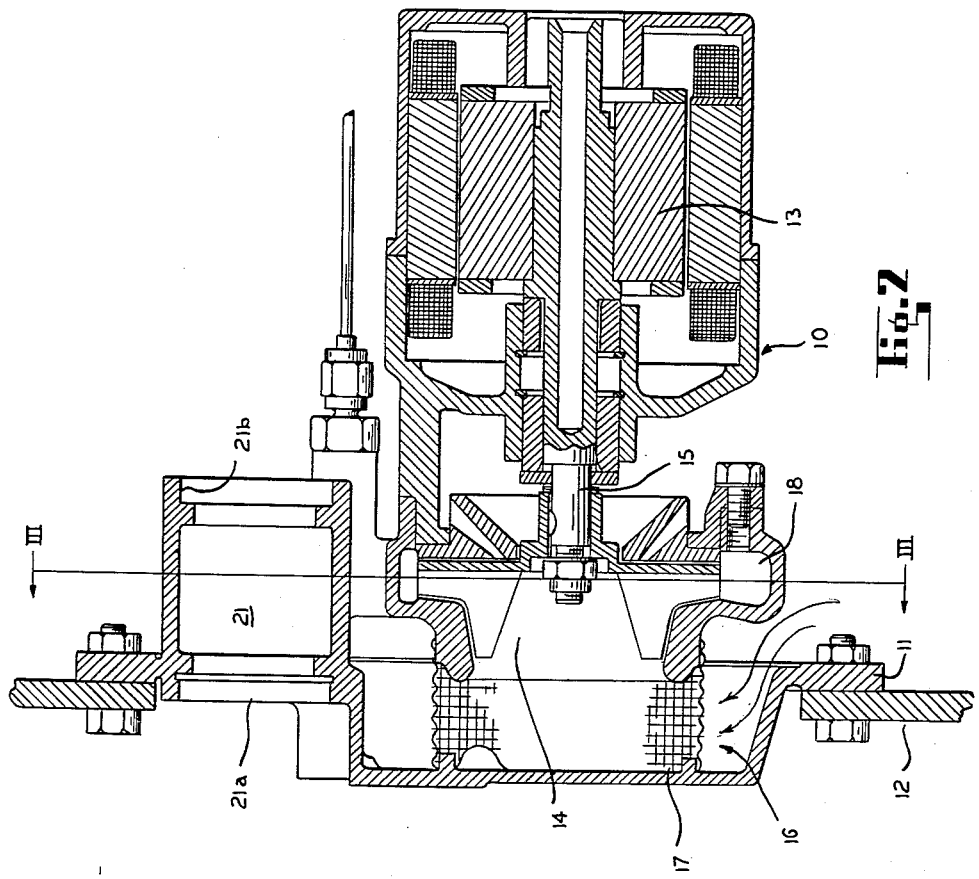
Figure 2 is a side elevational view in cross-section taken along the line II—II of Figure 1.
Figure 3:
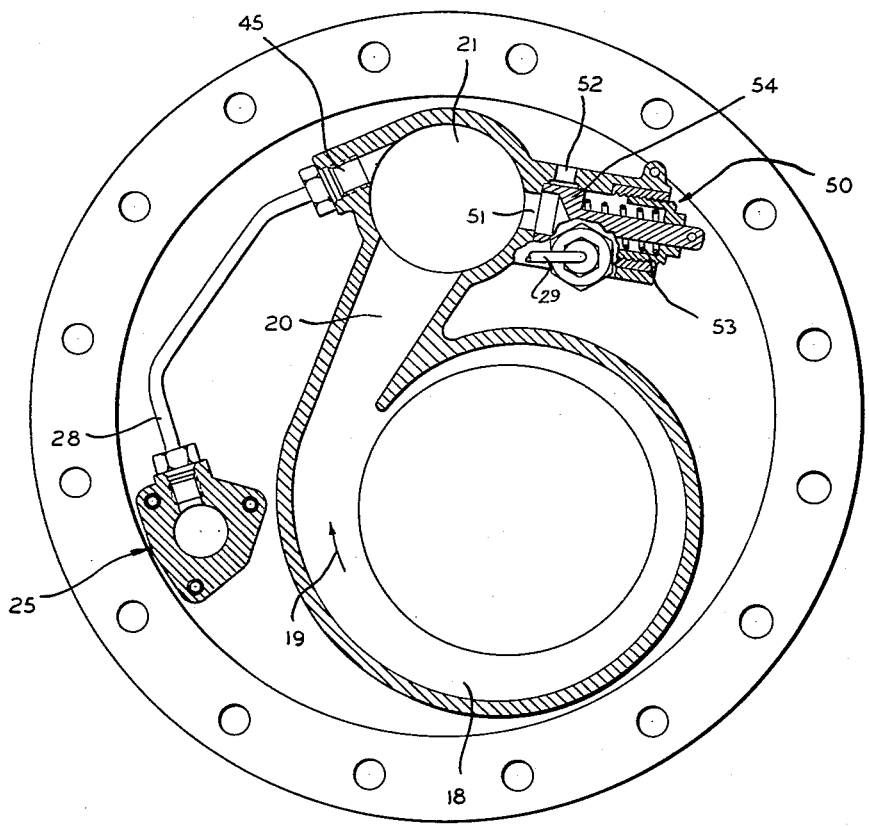
Figure 3 is an elevational view in cross-section taken along the line III—III of Figure 2.

As may be seen from a consideration of Figures 1 and 2, a centrifugal booster pump generally indicated at 10 is secured by means of flange 11 to an opening 12 in a fuel cell or the like. The pump 10 is provided with a motor 13 which drives a centrifugal impeller 14 by means of a shaft 15. As shown by the arrow 16, fuel is drawn through a wire mesh screen 17 radially inwardly and then axially toward the impeller 14 which forces the fuel outwardly into the volute pump outlet chamber 18. As illustrated in Figure 3, fuel flowing in the volute chamber 18 in the direction 19, passes through the volute nozzle 20 which has a slightly divergent form into a collector or outlet chamber 21. From the chamber 21 the fuel is passed into a final stage fuel pump or to any other desired point in the fuel system. The connection to the collecting chamber 21 may be made at either end 21 or 21b, the unused connection being closed by means of a cap, not shown.

The general centrifugal pump structure above described is, of course, not the subject matter of the present invention in a broad sense. The present invention as above noted is concerned with the provision of an automatic control system for the centrifugal pump thus far described and takes the form of regulator 25, reciprocal control valve and actuator 26 and the interconnecting conduits 27, 28 and 29 as incorporated into the centrifugal pump.

In order to provide a control valve of maximum efficiency with minimum weight and size, the control valve 26 comprises a reciprocal type gate valve positioned at the relatively small diameter volute nozzle 20. As shown in detail in Figure 5, the control valve assembly comprises a reciprocal gate valve member 30 positioned for movement transverse to the path of fluid flow in the nozzle 20. The gate 30 is biased into an open position by means of spring 31 and is urged into closed position upon the application of fluid under pressure to chamber 32, one wall of which is formed by diaphragm 33, secured to the gate valve shaft 34.

Fluid under pressure is directed to the chamber 32 via conduit 29 which is, as shown in Figure 6, connected to the collector chamber 21 by means of a bore 35. The spring 31 is constructed of a sufficiently low spring constant to permit closure of the gate valve 30 upon the application of a pressure in chamber 32 of substantially any value within the ordinary operating range of the pump. Control of the movement of the gate valve 30 is achieved accurately as a result of control of the pressure in chamber 32 by a regulator 25 shown in detail in Figure 4 and connected to the chamber 32 via conduit 27.

As illustrated in Figure 4, the regulator comprises a pressure relief valve 36 which, when closed, permits the application of pressure in the collector chamber 21 to the chamber 32. However, when the valve 36 opens, the pressure in chamber 32, and hence in conduit 27, is vented thereby permitting the spring 31 to force the gate 30 into the position shown in Figure 5 in which the nozzle 20 is open.

The regulator 25 comprises a fluid motor having a pressure chamber 40, a diaphragm 41, piston 42, output lever 43 and an adjustable biasing spring 44. Pressure is applied to the chamber 40 via conduit 28 from the collector chamber 21 via port 45. Accordingly, the actuation of the motor output lever 43 reflects the pressure in the booster pump at its output. This pressure pivots the output lever 43 about the pivot 47 against the biasing force of spring 44 to move a valve core 36a upwardly to close the valve 36. As above noted, closure of the valve 36 causes a pressure build-up in the gate valve chamber 32 closing the gate valve, which closure has the effect of reducing the pressure in the collector chamber 21 and hence relieving the pressure in the chamber 40. This follow-up action provides a suitably stable control for the gate valve and as a result of the adjustment of the spring 44 provided in the form of a set-screw 48, the output pressure of the pump in the collector chamber 21 may readily be adjusted.

Pressure relief for the output of the pump is provided in order to prevent excessive pressure rise downstream of the valve 26 at very low fuel flow and leakage past the valve gate 30. In the illustrated embodiment this comprises pressure relief valve 50 which vents the collector chamber 21 to the body of fuel in the fuel cell via ports 51 and 52 upon a fuel pressure in the collector chamber 21 sufficient to compress the spring 53 to a point at which the plunger 54 no longer overlaps the ports 51 and 52.

In the form of the invention above illustrated and described, pressure for operation of the gate valve is taken directly from the collector chamber 21, downstream of the gate valve. It will be understood, however, that the actuating pressure for the gate valve, namely, the pressure applied to chamber 32 via conduit 29, may, if desired, be taken from a port positioned immediately upstream of the gate valve. Such a positioning would provide a somewhat higher fluid pressure and where such an arrangement is used the spring 31 may be constructed of somewhat more rigid material to compensate for this fact. Whether the actual actuating pressure in the chamber 32 is taken from upstream or downstream of the gate valve 30, the actual control of the pressure, which control operates to cause movement of the gate 30, is achieved in the regulator 25, in response to fluid pressure variations downstream of the gate valve.

It will thus be seen that I have provided a novel and extremely compact pressure regulator control system and pump. In accordance with the present invention a gate valve is provided at a position in the volute nozzle where a small gate may be successfully used without detracting from the fluid flow efficiency. At the same time, the positioning of the gate valve in the manner shown, permits its control in a very convenient manner with an absolute minimum of conduit connections. Further, the conduits utilized are of short length, providing high resistance to fatigue failure. Still further, it will be noted that the entire pump may be removed from the fuel cell without in any way requiring dismantling of the fuel pressure regulator system. Accordingly, where any maintenance is required on the fuel pump regulation system, the entire apparatus may be removed as a unit with its pump for test purposes in a convenient test rack where actual operating conditions may be established and where, once the proper adjustments have been made, the adjustments are in no way affected by subsequent installation of the unit into an actual fuel cell. As a result of the present construction, an extremely inexpensive, highly efficient light-weight regulator and pump assembly has been provided wherein adjustments may easily be made and maintenance is unusually simple.

It will, of course, be apparent to those skilled in the art that variations and modifications may be made in accordance with the principles of the present invention and within the scope thereof and, accordingly, it is my intention that the scope of the present invention be limited solely by that of the hereinafter appended claims.

I claim as my invention:

1. In combination in an integrated centrifugal fluid pump and control unit, a housing, means defining a centrifugal pump chamber in said housing, means defining a collector chamber in the housing, means defining a volute pump outlet surrounding said centrifugal pump chamber, means defining a diverging passageway leading to said collector chamber from said volute pump outlet and tangential to said volute, said collector chamber being of greater cross section than the tangential passageway leading to said collector chamber, a reciprocal gate valve movable in said diverging passageway transversely thereof to constrict said tangential passageway to thereby reduce the output of said pump, a first fluid motor on said housing for closing said valve, means on said housing applying the pump discharge fluid pressure to said first fluid motor to close said valve, a vent valve on said housing connected for relieving the pressure in said fluid motor, a second fluid motor on said housing and conduit means connecting said collector chamber to the second fluid motor to provide a control pressure in said second fluid motor acting to move said second fluid motor to close said vent valve upon an increase in pressure in said collector chamber beyond a predetermined value.

2. In combination in an integrated centrifugal fluid pump and control unit, a housing, means defining a centrifugal pump chamber in said housing, means defining a collector chamber in the housing, means defining a volute pump outlet surrounding said centrifugal pump chamber, means defining a diverging passageway leading to said collector chamber from said volute pump outlet and tangential to said volute, said collector chamber being of greater cross section than the tangential passageway leading to said collector chamber, a valve positioned in said diverging passageway to constrict said passageway to reduce the output of said pump, a first fluid motor on said housing for closing said valve, means on said housing applying pump discharge fluid pressure to said first fluid motor to close said valve, a vent valve on said housing connected for relieving the pressure in said fluid motor, a second fluid motor on said housing, and conduit means connecting said collector chamber to the second fluid motor to provide a control pressure in said second fluid motor acting to move said second fluid motor to close said vent valve upon an increase in pressure in said collector chamber beyond a predetermined value.

References Cited in the file of this patent

UNITED STATES PATENTS

| 1,111,498 | Rotter | Sept. 22, 1914 |
| 1,369,602 | Amsler | Feb. 22, 1921 |
| 2,067,757 | Fielden | Jan. 12, 1937 |

FOREIGN PATENTS

| 510,901 | Belgium | May 15, 1952 |
| 599,640 | Great Britain | Mar. 17, 1948 |
| 613,383 | France | Oct. 23, 1926 |
| 827,006 | Germany | Jan. 7, 1952 |